United States Patent [19]

Freitag et al.

[11] Patent Number: 4,592,649
[45] Date of Patent: Jun. 3, 1986

[54] PHOTOGRAPHIC ROLLER COPYING APPARATUS

[75] Inventors: Friedbert Freitag, Unterhaching; Friedrich Hujer, Petershausen; Erich Nagel, Anzing; Bernd Payrhammer; Wolfgang Zahn, both of Munich, all of Fed. Rep. of Germany

[73] Assignee: Agfa-Gevaert AG, Leverkusen, Fed. Rep. of Germany

[21] Appl. No.: 713,268

[22] Filed: Mar. 18, 1985

[30] Foreign Application Priority Data

Apr. 4, 1984 [DE] Fed. Rep. of Germany ....... 3412692
Apr. 4, 1984 [DE] Fed. Rep. of Germany ....... 3412690

[51] Int. Cl.$^4$ ...................... G03B 27/52; G03B 27/70
[52] U.S. Cl. ......................................... 355/43; 355/66
[58] Field of Search ..................... 355/43, 46, 60, 66

[56] References Cited

U.S. PATENT DOCUMENTS

| | | | |
|---|---|---|---|
| 2,257,551 | 9/1941 | Griffin et al. ........................ | 355/43 |
| 3,323,414 | 6/1967 | Ritchie et al. ....................... | 355/43 |
| 3,574,459 | 4/1971 | Hartwig et al. ...................... | 355/66 |
| 3,649,119 | 3/1972 | Rempala et al. ..................... | 355/45 |
| 3,689,149 | 9/1972 | Livingood ............................ | 355/46 |
| 3,802,773 | 4/1974 | Schneider ............................ | 355/43 |

FOREIGN PATENT DOCUMENTS 1953015 2/1977 Fed. Rep. of Germany ........ 355/40

Primary Examiner—Monroe H. Hayes
Attorney, Agent, or Firm—Michael J. Striker

[57] ABSTRACT

A photographic roller copying apparatus for processing films of different sizes includes a scanning device for determining a size of the film to be processed, an illuminating device, a film-supporting platform having at least one aperture adjustable to the size of the film to be processed by a pivotable plate provided on the illuminating device, and two projection systems interchangeably movable into a path of light from the illuminating device. One of the projection systems includes a pair of porroprisms for rotating the image of an original positioned in the image aperture by 90°.

12 Claims, 4 Drawing Figures

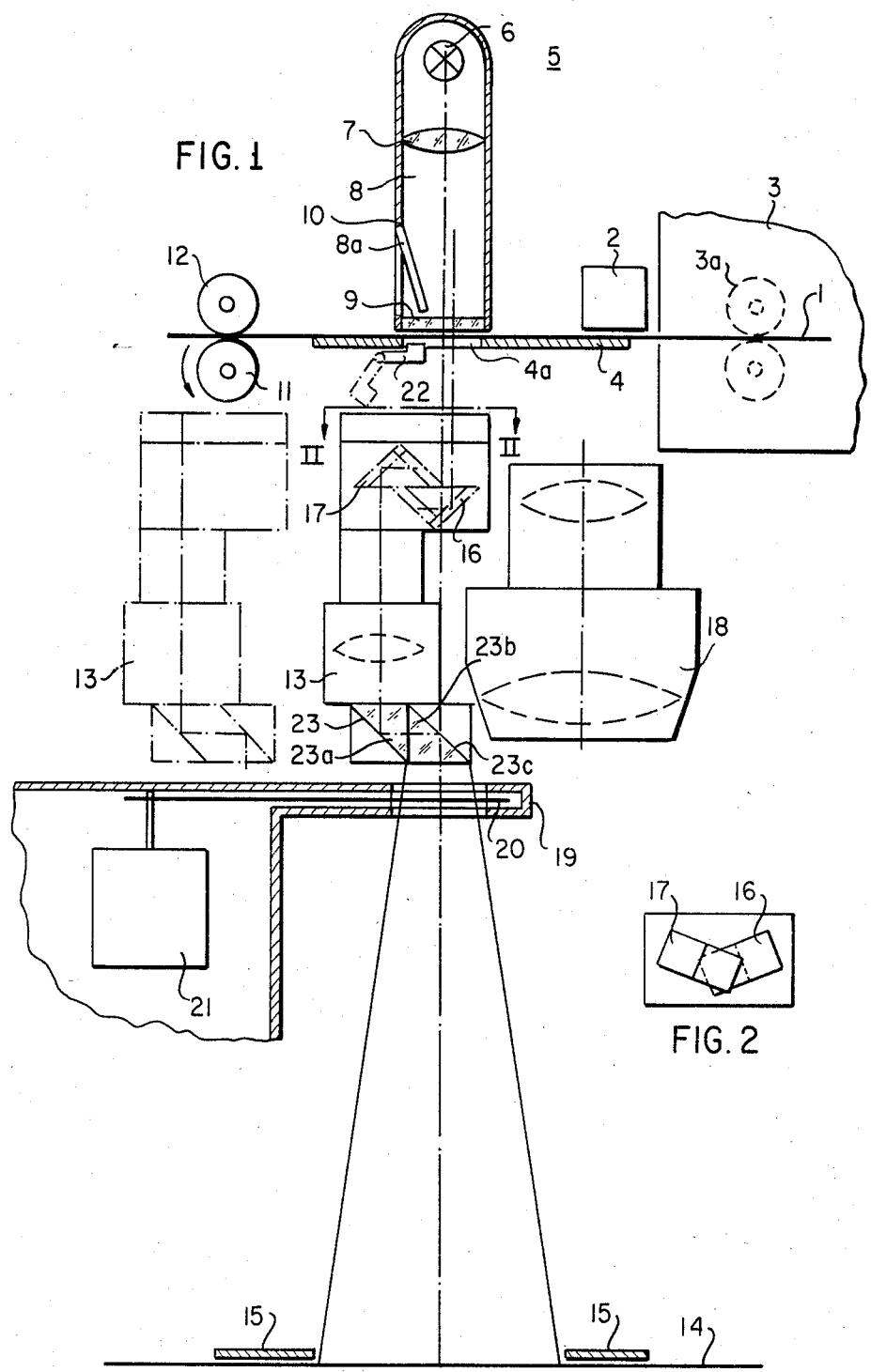

PHOTOGRAPHIC ROLLER COPYING APPARATUS

BACKGROUND OF THE INVENTION

The present invention relates to a photographic roller copying apparatus for processing films having various formats.

In use of the photographic cameras with so-called half-size films 18×24 mm and because of necessary adjustments, such as glueing of unprocessed films to form long tapes, the problem has occurred that the film tape contained of a plurality of films can have various dimensions of originals.

A roller copier of the type under discussion, which is disclosed, for example in German Pat. No. 1,953,015, is utilized for copying film rolls, in which the film includes the originals of different formats, and wherein an automatic control of the image aperture for a corresponding original format is provided in accordance with markings formed on the edge of the film or on the film end. The copying process in this known copier results in that in case of a constant image scale of the originals having format 18×24 mm, only a half of copies can be made, as compared to the copies made from originals having format 24×36 mm. Therefore such a copier has been found rather inefficient.

SUMMARY OF THE INVENTION

It is an object of the present invention to provide an improved photographic roller copying apparatus.

It is another object of this invention to provide a roller copier for processing films of different size in which the size of originals is adjusted to the width of the film tape.

These and other objects of the invention are attained by a photographic roller copying apparatus for projecting film originals of various sizes onto a tape-like copying material, the width of which corresponds to a desired size of a copy, and wherein originals are arranged in a tape and have one dimension extended along said tape and another dimension extended transverse of said tape, the apparatus comprising two projecting systems; and means for illuminating an original, said projecting systems being interchangeably movable into a path of light in dependence on the format of the original being projected, one of said projecting systems including a pair of light path-displacing rotating porro-prisms for rotating an image to be projected by 90°, and means for obtaining a parallel displacement of the image, which displaces the image back against the direction of the displacement by the rotating porro-prisms for overlapping the light path without the use of the porro-prisms.

The two projecting systems utilized in the copier of this invention have the image scales which are selected so that the respective original is projected onto the paper tape in a desired size. The projection of smaller originals which lie transversely of the elongation of the film is obtained by rotating prisms, particularly by porro-prisms which cause the rotation of the image by 90°.

An additional device with two inclined and parallel mirror-covered surfaces or with a rhombus prism is provided in the copier. This additional device shifts the image displaced by the rotating prisms back in the counter direction.

The device may further include a film-supporting platform having at least one aperture which is adjustable for exposing the originals of two formats, and a flap displaceable to expose the entire aperture for processing originals of greater format and to partially close said aperture to expose a portion thereof for processing originals of smaller format lying transversely of the tape of the originals.

The illuminating means may include a mirror shaft having an outlet opening corresponding to a greater format of the original being projected, said mirror shaft including a shaft wall pivotable about an axis parallel to the plane of an original exposed in said aperture to a position in which light is concentrated on an original of a smaller format.

In another embodiment the illuminating means may include a mirror shaft extended up to said apertures, and a shaft wall pivotable about an axis positioned between two apertures so as to selectively expose to light one of said apertures and to shut from light another of said apertures.

The mirror shaft may be asymmetrical in the direction of said tape and have a vertical cylindrical portion positioned against one of said apertures for illuminating originals of greater format, and another portion laterally offset relative to said vertical portion and positioned against another of said apertures for illuminating originals of smaller format.

The mirror surfaces of the mirror shaft side walls and of the pivotable shaft wall, or the above-mentioned rhombus prism bring the axis of the image back into register with the optical image without the use of the rotating prisms.

The enlargement of an optical path by means of the rotating prisms and by the double prism with the mirror surfaces should be taken into consideration by selecting the type of the objective to be used.

The apparatus may further include a scanning device for scanning format markings and image notches provided on the film tape, and an adjusting member for interchanging said projecting systems in the path of light, said scanning device through said adjusting member controlling the switching of said pivotable shaft wall and the positioning of an original in the aperture which corresponds to the format of the original to be processed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a front schematic view of a photographic roller copier according to the invention;

FIG. 2 is a view seen from line II—II of FIG. 1;

DETAILED DESCRIPTION OF THE PREFERRED EMBODIMENTS

Figures 3, 4:
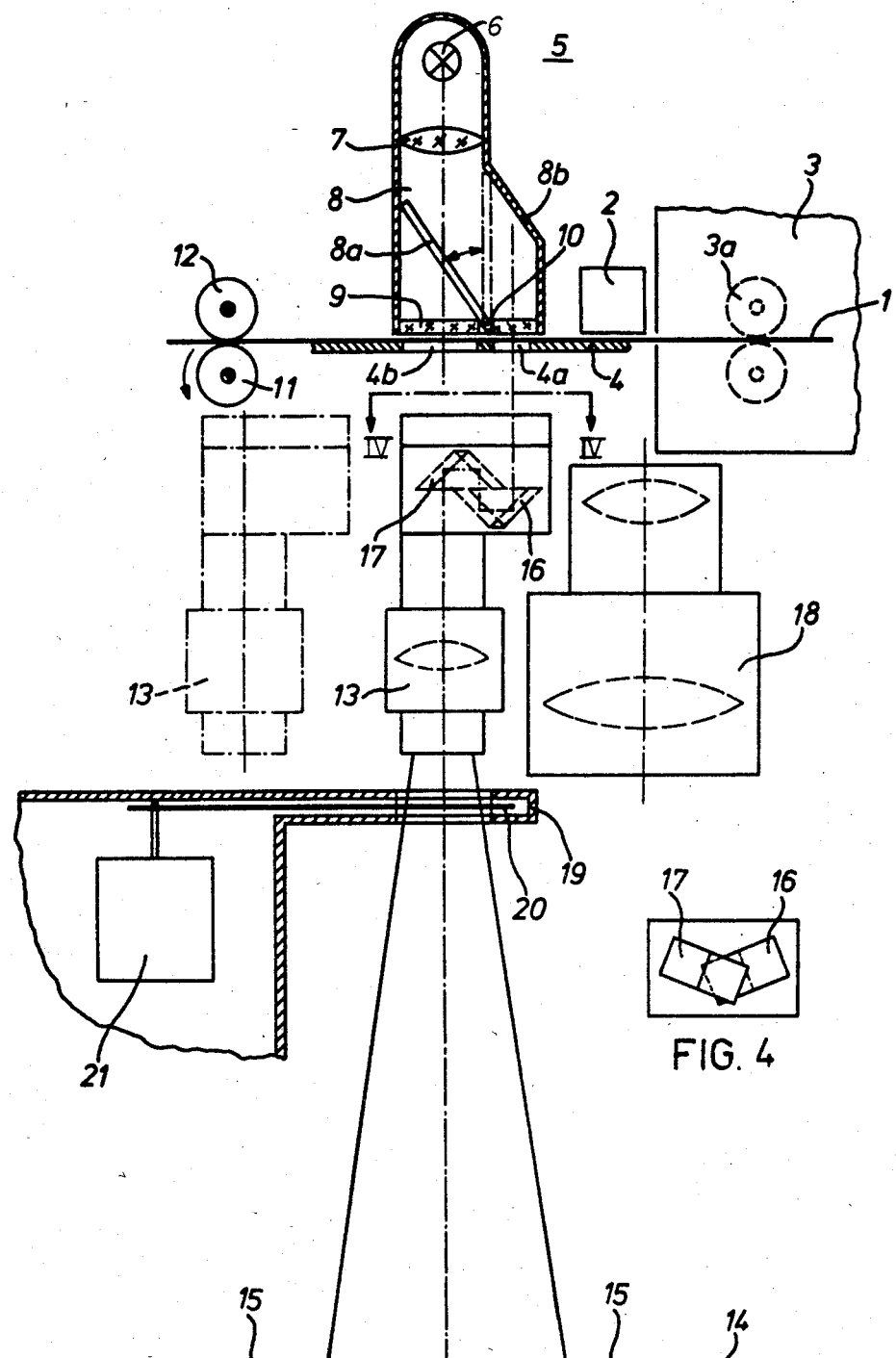
FIG. 3 is a front schematic view of the copier in accordance with another embodiment with two displaced image apertures.
FIG. 4 is a view seen from line IV—IV of FIG. 3.

Referring now to the drawings, and first to FIGS. 1 and 2 thereof, reference numeral 1 designates a film tape which is combined of a plurality of individual films glued together as disclosed, for example in German Pat.

No. 1,953,015. Films of various formats, namely 24×36 mm and 18×24 mm can be combined in such film tape. Grooves or notches are made at the edge of the film tape at predetermined intervals from each other for each image original. These notches are mechanically or photoelectrically scanned for transporting in position inside the copier. The film tape can have, in the known fashion, specific marks at the spots of the glue, these marks being also automatically scanned, and a signal is generated for a format of the following film in the tape.

The distance between the neighboring notches provided in accordance with German Pat. No. 1,953,015, and also the format change at the spots of glueing between the films can be scanned along the transportation of the film by means of a scanning station 2. A cleaning device 3 with rotating brushes 3a is arranged before the scanning device 2 in the direction of the film transport. Brushes 3a remove dust collected on the film from the latter before a copying process starts.

A copier station for the film transported in the direction from the right to the left has a supporting plate 4 with an image aperture 4a, the latter corresponding in its greater dimension to format 24×36 mm, lying in the direction of elongation of the film tape. For a smaller, transversely lying format 18×24 mm, an eccentrically positioned portion of the image aperture, facing toward the scanning device 2, is utilized. The portion of the image aperture 4a which is not used during the processing of a smaller format is in this case closed by means of a pivotable or displaceable flap 22 mounted to the supporting plate 4.

An illumination device 5 is positioned above aperture 4a. The illumination device 5 comprises a copier lamp 6, the light of which is projected through a suitable reflector and a condensor lens 7 mounted in a shaft or chute 8. The shaft 8 can be formed as a mixing shaft or a mirror shaft which corresponds in its cross-section to the format of the original being projected. Shaft 8 at its lower side facing toward the original, has a diffusing lens or screen 9. Shaft 8 approximately corresponds in its cross-section to a smaller size of the image. A wall 8a of shaft 8, positioned above flap 22, is pivotally supported at its upper end about an axis 10 which is parallel to the plane of the original and perpendicular to the direction of transportation of the film so that wall 8a is movable inwardly of square-shaped shaft for processing a smaller original format to its inclined position, shown in FIG. 1, in which the lower edge of the shaft wall lies approximately above the center of the image operature 4a. In this position, practically the entire light stream of lamp 6 is satisfactorily homogenized through the mirror shaft 8 on the diffusing lens 9 and projected via aperture 4a in accordance with its available cross-section for a half format.

This shifting is dependent upon the dimensions of prisms 16, 17, which define a cross-section of the light beam in the region of the prisms.

In order to expose onto a copying material 14 a half size image in the same position as the original of format or size 24×36 mm, a so-called double prism 23 is provided below an objective 13. Double prism 23 is formed of a one-piece glass member, the operation of which is as follows:

An inlet surface of a first even-legged rectangular prism 23a, the reflecting diagonal of which is inclined by 45° to the beam path, faces towards the outlet surface of the objective 13. The light beam deflected in the horizontal direction passes through a plane-parallel glass plate 23b of a suitable thickness onto a second prism 23c which at its reflecting diagonal surface, deflects the image axis to a diagonal crossover point of the exposure aperture limited by screens or masks 15.

Two transporting rollers 11 and 12 are arranged at the left-hand side of the supporting plate 4, rollers 11, 12 transporting the film tape after the copying process has been completed. The accurate positioning of the image-carrying original is controlled by scanning the edges of the aforementioned notches so that the aperture 4 is brought into a correct position corresponding to the size of the original.

Following means are provided for exposing the original positioned against the aperture 4a:

So-called half-size originals on the aperture 4 are projected via the objective 13 onto the tape of the light-sensitive copying material 14, the length of which available for exposing, is limited in the tape-transporting direction by screens 15.

A set of rotating prisms, or porro-prisms 16, 17, which deflect the image viewed therethrough many times by 90°, respectively, are positioned between the image aperture 4a and the objective 13. Thus the rotation of the image by 90° is obtained by the arrangement of the prisms at a mutual angle of 135°, as shown in FIG. 2. A displacement of the image in the direction of the original transportation is associated with such a rotation due to a multiple reflection and due to horizontal components of the image beam. The original positioned against the image aperture 4a with its longer side being transversal to the direction of elongation of the film tape is, after the rotation of prisms 16, 17 and by means of objective 13, imaged onto the copying material tape 14 so that the longer side of the original extends in the direction of elongation of the copying material tape, which is paper. The scale of imaging via objective 13 is determined such that the smaller the width of the original is directly in register with the width of the copying material tape.

For copying originals of normal size in accordance with the size of the image aperture 4a, a re-arrangement of the device is necessary. The objective 13 with both rotating prisms 16, 17 is moved in a suitable guide by a conventional means, for example stepping motor, in the leftward direction as shown by dash-dotted lines whereas the objective 18 of the known type is drawn from the illustrated position rightwardly away from the beam path and in the same way further leftwardly unless the axis of objective 18 will coincide with the axis of the shaft 8 housing the lamp 6. For copying films of the size 24×36 mm the shaft wall 8a is pivoted to the vertical position so that the entire light stream from condensor lens 7 is transmitted onto the diffusing lens 9 above the image aperture 4a. The objective 18, which can be, for example a vario objective, forms then in aperture 4 an image, the direction of elongation of which coinsides with the direction of elongation of the film tape of originals, without moving the rotating prisms in the direction of elongation to the copying material tape.

To enable the apparatus to make copies with short exposure time periods a lock 19 is arranged in an effective position below the objective 13 or 18. Lock 19 includes a locking plate 20 and a rotating magnet 21 connected to plate 20 and which pivots the plate into a beam path for ending the copying process.

The mode of operation of the apparatus is as follows:

After the end of a new film is moved through a cleaning device 3 and transport rollers 11, 12 the end of the first frame of the film appears under the scanning device 2. A format or size of the original is defined in the following film by the scanning device 2. A normal size picture format, as shown in the position of FIG. 1, corresponds to the entire cross-section of the aperture 4. By means of any suitable motor-driven adjustment device the objective 13 with rotating prisms 16, 17 is moved to a dashed-line position whereas at the same time the normal objective is moved so that its axis coinsides with the axis of the lamp shaft or housing 8. Simultaneously the pivotable shaft wall 8a is moved to a vertical position shown by dashed line. Flap 22 is then pivoted away to an open position. The film frame of a small format positioned in the aperture 4a is illuminated with entire light flow emitted by lamp 6 and transmitted through condensor lens 7, and the image is transmitted via objective 18 onto the tape of the copying material 14 as long as lock 19 is opened. All the frames of the film are copied in the same fashion while copying material tape 14 is transported below objective 18 by any suitable conventional means.

As a following glue spot on the film enters the scanning device 2 the format of the originals in the next film is scanned and it is examined whether the copying device is adjusted to this format. If the adjustment to a normal size or format of the film original in accordance with the entire cross-section of aperture 4a has been described above the adjustment of the device to the film having originals of the size 18×24 is carried out in a reverse direction. The objective 18 is displaced to its right-hand position shown in FIG. 1 while the objective 13 is moved to the position shown by the solid line. The pivotable shaft wall 8a should be brought to its inclined position. The position of the first original of a half-size is controlled by a respective feeding means, for example by means for imparting a different number of steps of advancing the film from the scanning station 2 to the aperture 4 so as to place the original in the correct position in correspondence with the exposed portion of the aperture 4a. The image of this original is rotated by 90° by means of prisms 16, 17. The projection of the image through the objective 13 and the double prism 23 produces a format-filled copy which extends in the direction of elongation of tape 14.

FIGS. 3 and 4 illustrate a modified embodiment of the invention. The supporting plate 4 for supporting the film originals has two apertures 4a and 4b. The image aperture 4a has the size which corresponds to the original size 18×24 mm whereas the image aperture 4b has the cross-section which corresponds to the size of the original 24×36 mm. A single illumination device 5 is provided for the both image apertures. Light emitted from lamp 16 and enhanced by the non-shown reflector is transmitted through the condenser lens 7 towards the supporting plate 4. The mixing shaft 8 is formed in this embodiment as a mirror shaft and has a cross-section area which approximately corresponds to the size of the original. Mirror shaft 8 has at its lower side, facing the original to be imaged, a diffusing lens or screen 9.

In the exemplified embodiment with two image apertures 4a and 4b, the cross-sectional area of the shaft 8 corresponds to the picture format 24×36 mm, and in the case of aperture 4a having a half-size the shaft wall 8a is non-rigid but pivotable about an axle 10 positioned between two apertures 4a and 4b. Axle 10 extends in parallel with the plane of the original and normally to the direction of transportation of film tape or strip 1. When shaft wall 8is in the position shown by dash-dotted line this wall is in register with the mirror-covered side wall of shaft 8 so that aperture 4b is available, whereas when the shaft wall 8a is in the position shown by solid line this wall 8a abuts with its end the opposite mirror-covered side wall of shaft 8 so that light emitted from above is deflected to the wall provided in an extension 8b of the lamp shaft or housing 8, extension 8b overlapping the aperture 4a. The shaft extension 8b is at its inner side completely mirror-covered so that light transmitted from condensor lens 7 is deflected by the mirror-covered upwardly-directed surface of shaft wall 8a and is homogenized by a multiple reflection, mixed and transmitted onto the diffusing lens or screen 9 above the image aperture 4a.

For the projection of the original positioned in image aperture 4a or 4b the following means are provided:

The half-size originals in aperture 4a are imaged via objective 13 and porro-prisms 16, 17 to the copying material 14. The image scale is determined by the objective so that a copy having a smaller width directly fills up the width of the copying material tape 14.

For copying originals having a normal size corresponding to the dimensions of aperture 4b the objective 18 is utilized. For copying the films having format 24×36 mm the shaft wall 8a is pivoted to the vertical position so that the entire light beam of condensor lens 7 is transmitted along the mixing shaft 8 to the diffusing lens 9 above aperture 4b. The objective 18, which is, for example a conventional vario objective, forms an image in aperture 4b, the direction of elongation of which coincides with the direction of elongation of the tape, without moving the rotating prisms in the longitudinal direction towards tape 14.

The operation of the above-described apparatus is as follows:

After the starting end of a new film has been transported through the cleaning device 3 and the transport rollers 11, 12 this end arrives under the scanning device 2. The size of the originals in this film is determined by the scanning device, for example, as seen in FIG. 3, a normal format would be that which corresponds to aperture 4b. Then by means of a suitable motor-driven adjustment device (non-shown) the objective 13 with rotating prisms 16, 17 is moved to the left-hand position shown by dash-dotted line whereas the normal objective 18 is brought in the position in which his axis coincides with the axis of shaft 8. Simultaneously the pivotable shaft wall 8a is moved to the vertical position. The small original positioned in aperture 4b is illuminated by substantially entire light beam and is imaged by the objective 18 onto copying material tape 14 as long as lock 19 is opened. Then all originals of this film are copied in the same manner while tape 14 is transported between masks 15.

When a following glue spot enters the scanning station 2 the size of the next film is determined and it is also examined whether the whole copying device is adjusted to this size. If the film originals to be copied now have the size 18×24 mm the adjusting process is performed in the reverse direction. The objective 18 is displaced to the position shown by solid line while the objective 13 is also moved to its position illustrated by solid line so that the axis of objective 13 would coincide with the axis of shaft 8. The shaft wall 8a is brought to its inclined position. The first original of the half-size film is controlled by a respective adjustment of the feeding means, for example by the application of another number of steps to the scanning station 2, and placed into the correct position in correspondence with the aperture 4a. The image of this original is rotated by 90° by prisms 16, 17. The projection by the objective 13 results in a format-filled copy which extends in the direction of elongation of tape 14.

The apparatus of this invention can be also utilized for other formats of the films, for example for a square format; then the objective 8 can be used. The exposure of the original would be carried out through aperture 4b which would be cut at both edges. It is also possible to use a stationary objective in place of the vario objective 18 when roughly stepped various image scales for the originals having the size 24×36 mm are to be used.

Both projection systems 13 and 18 can be arranged on individual motor-driven carriages spaced from each other by a distance corresponding to the path of their displacement.

The invention can be also utilized when copies are exposed such that they would lie with their widths transversely of the copying material tape. The rotary prisms will be then provided on the objective for originals sized 24×36 mm. Simultaneously the support of aperture 4a will be changed.

It will be understood that each of the elements described above, or two or more together, may also find a useful application in other types of photographic copying apparatus differing from the types described above.

While the invention has been illustrated and described as embodied in a photographic copying apparatus, it is not intended to limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A photographic roller copying apparatus for projecting film originals of various sizes on a tape-like copying material, the width of which corresponds to a desired format of a copy, and wherein originals are arranged in a film tape and have one dimension extended along said tape and another dimension extended transverse of said tape, the apparatus comprising two projecting systems; and means for illuminating an original, said projecting systems being interchangeably movable into a path of light in dependence on the format of the original being projected, one of said projecting systems including a pair of light path-displacing rotating porro-prisms for rotating an image to be projected by 90°, and means for obtaining a parallel displacement of the image which displaces the image back counter to the direction of the displacement obtained by the rotating porro-prisms for covering the light path without the use of the porro-prisms.

2. The apparatus as defined in claim 1, wherein said means for obtaining a parallel displacement includes at least one rhombus prism.

3. The apparatus as defined in claim 2, wherein during an exposing of originals onto the copying material in the direction of the tape-like copying material said one projecting system with said rotating prisms is used for smaller originals lying transversely of the tape.

4. The apparatus as defined in claim 3, further including a film-supporting platform having at least one aperture which is adjustable for exposing the originals of two formats, and a flap displaceable to expose the entire aperture for processing originals of greater format and to partially close said aperture to expose a portion thereof for processing originals of smaller format lying transversely of the tape of the originals.

5. The apparatus as defined in claim 4, wherein said illuminating means include a mirror shaft including a light source and having an outlet opening corresponding to a greater format of the original being projected, said mirror shaft including a shaft wall pivotable about an axis parallel to the plane of an original exposed in said aperture to a position in which light is concentrated on an original of a smaller format.

6. The apparatus as defined in claim 1, further including a film-supporting platform having two image apertures each corresponding to a size of an original being processed, said apertures being offset relative to each other in correspondence with the displacement of the image by said rotating prisms.

7. The apparatus as defined in claim 6, wherein both apertures are illuminated by said illuminating means.

8. The apparatus as defined in claim 6, wherein said illuminating means are switchable from one of said apertures to another.

9. The apparatus as defined in claim 7, wherein said illuminating means are displaceable from one of said apertures to another.

10. The device as defined in claim 7, wherein said illuminating means include a mirror shaft extended up to said apertures and including a light source and a shaft wall pivotable about an axis positioned between said two apertures so as to selectively expose to light one of said apertures and to shut from the light another of said apertures.

11. The device as defined in claim 10, wherein said mirror shaft is asymmetrical in the direction of said tape and has a vertical cylindrical portion positioned against one of said apertures for illuminating originals of greater format, and another portion laterally offset relative to said vertical portion and positioned against another of said apertures for illuminating originals of smaller format.

12. The device as defined in claim 11, further including a scanning device for scanning format markings and image notches provided on the film tape, and an adjusting member for interchanging said projecting system in the path of light, said scanning device through said adjusting member controlling the switching of said pivotable shaft wall and a positioning of an original in the aperture which corresponds to the format of the original to be processed.

* * * * *